Nov. 5, 1963    E. O. CLAY    3,109,214
QUICK FASTENING DEVICE FOR STRUCTURAL MEMBERS
Filed Aug. 31, 1960    7 Sheets-Sheet 1

INVENTOR.
EUGENE O. CLAY
BY
Charles F. Dischler
ATTORNEY

Nov. 5, 1963 E. O. CLAY 3,109,214
QUICK FASTENING DEVICE FOR STRUCTURAL MEMBERS
Filed Aug. 31, 1960 7 Sheets-Sheet 4

INVENTOR.
EUGENE O. CLAY
BY
Charles F. Diechler
ATTORNEY

Nov. 5, 1963  E. O. CLAY  3,109,214
QUICK FASTENING DEVICE FOR STRUCTURAL MEMBERS
Filed Aug. 31, 1960  7 Sheets-Sheet 5

INVENTOR.
EUGENE O. CLAY
BY
Charles F. Dischler
ATTORNEY

Nov. 5, 1963 E. O. CLAY 3,109,214
QUICK FASTENING DEVICE FOR STRUCTURAL MEMBERS
Filed Aug. 31, 1960 7 Sheets-Sheet 6

INVENTOR.
EUGENE O. CLAY
BY
Charles F. Dischler
ATTORNEY

*INVENTOR.*
EUGENE O. CLAY
BY
Charles F. Diechler
ATTORNEY

United States Patent Office 3,109,214
Patented Nov. 5, 1963

3,109,214
QUICK FASTENING DEVICE FOR STRUCTURAL MEMBERS
Eugene O. Clay, Los Angeles, Calif., assignor to North American Aviation, Inc.
Filed Aug. 31, 1960, Ser. No. 57,601
10 Claims. (Cl. 24—221)

This invention relates to fastening devices for releasably clamping and locking together two or more members in close face-to-face engagement and is a continuation-in-part of my copending application Serial No. 802,925 filed March 30, 1959, now abandoned. More specifically, the present invention relates to a quick disconnect fastener capable of rigidly and securely clamping highly stressed aircraft members wherein such members may include exterior panel or skin members of the aircraft and the fastener presents an aerodynamically flush continuation of the aircraft outer panel surface.

Fastener devices adapted to quickly attach and detach sheet metal parts, including aircraft cowlings and the like, to substructure such as frame members have been known in the prior art in many forms and configurations. Generally, these prior art fastening devices have employed a sheet metal stamping or spring-like member providing camming surfaces to coact with a rotatable stud member having a suitable element for contacting the cam to draw the sheet metal parts into engagement. While such devices have proven adequate for their intended use, rapid advancements in the art of aircraft design have rendered such fasteners obsolete.

As the mission capabilities of modern supersonic aircraft and missiles are extended further into the higher Mach number region, design requirements often dictate that the various surface area skins and panel members of the aircraft become highly stressed structural members of the aircraft as opposed to the heretofore normal function of such panels of being a mere skin or covering on lower speed aircraft. This results from the necessity of eliminating as much as possible the heavy structural spars, longerons and rib members formerly used to form a frame upon which skin members were the fastened to form the envelope of the aircraft. Under present design concepts the skin members themselves may be formed of high-strength, heat-resistant stainless steels and become an integral structural portion of the aircraft.

In some aircraft constructions the primary airfoil surfaces are designed to aeroelastically deflect during flight to a position different from that which obtains when the aircraft is statically at rest on the ground. When these surfaces sag or deflect into their static at-rest position, some of the panels, and especially those panels that encase or surround engines which are located within the envelope of the aircraft and are not suspended in separate pods, become exceedingly highly stressed and are often deformed and bowed and thereby made even more difficult of removal, particularly if secured in place by ordinary screw or bolt attachments. Yet, it is precisely panels of this type that must be removed for constant servicing of the engines and engine accessories.

The ever growing vast array of increasingly complex mechanical, hydraulic and electronic equipment carried within modern aircraft, and particularly in military aircraft, requires the provision of an adequate number of access doors and removable panels to allow servicing and maintenance of such equipment. Furthermore, while such panels and doors must be securely attached to other portions of the aircraft in order to form a strong integral structure, they must be readily removable in an absolute minimum of time.

The present invention, therefore, is broadly directed to a quick-opening, high-strength fastening means which will clamp or hold two or more highly stressed load-bearing structural members in face-to-face relationship so that they form an integral structural part and yet they may be quickly detached, as required, for servicing and the like.

In high-speed supersonic aircraft and missiles, no surface discontinuities such as cracks, cavities or depressions can be tolerated in the aerodynamic envelope. Therefore, the requirement of flushness and smoothness of the exposed outer surface of the fastener, to effectively form, in conjunction with the surface panels, a smooth uninterrupted surface, is mandatory. No such quickly-operable, flush, smooth-surfaced fastener is known in the prior art.

Accordingly, the present invention specifically contemplates a quickly-operable, high-strength fastener assembly which incorporates a bolt member having a head portion adapted to be carried by one of the members to be joined. This bolt member coacts with a socket member, formed in or carried by the other member to be joined, for reception of the bolt head with the bolt being insertable into the socket member and then placeable in load-bearing engagement with the socket member by rotation of the bolt. A keying means within the bolt head, which also operates to provide a flush smooth surface on the exterior of the fastener, automatically locks the bolt to the socket member to prevent disengagement of the bolt by accidental rotation of the latter to the open or disengaged position.

While the workpieces secured together are variously described in this specification as panels, plates, structural members and the like, it will be clearly understood by those skilled in the art that the fastener device of this invention is not limited to use with any particular form or type or structure but is universal in its application. As such, it may be used to join panels or plates to other panels or plates, or it may be utilized for fastening sheet-like members such as panels or plates to heavier structural members, such as channels, beams, columns and the like. Similarly, it may be used for securing structural members to other structural members. While my quick-opening fastener finds great utility in any of the above applications, it is particularly advantageous for use in joining highly stressed members and especially those which have deformed under the stresses created therein.

Therefore, it is a primary object of the present invention to provide a quickly-operable, high-strength fastening device for securing highly stressed structural members in face-to-face engagement.

It is another object of the present invention to provide a fastener device which is dependent for its load transmitting characteristics upon bearing area engagement between the mating members and which does not depend upon spring-like or resilient members for transmitting the primary bearing loads.

Yet another object of the invention is to provide a fastener device which can be utilized with a draw-up wrench to secure panel members, that have become highly deformed under the stresses acting therein, into firmly clamped face-to-face engagement.

Still another object of the present invention is a quickly-operable fastener assembly wherein the fastener components are not removed from the structural members upon disengagement of the fastener but, rather, remain in such members upon separation of the latter and are thus positioned for quick engagement upon returning the structural members into overlapping juxtaposition relative to each other.

A further object of this invention is the provision in the fastener assembly of an anti-rotation locking member which also forms the aerodynamic closeout member whereby the surface of the device is a flush and substantially uninterrupted continuation of a panel surface.

A still further object of this invention is the provision of a quick-acting fastener device whereby structural members may be drawn into engagement by means of a suitable high leverage tool and thereupon locked by quadrantal rotation of the tool; and whereby the fastener may be disengaged by a reverse sequence of manipulative steps of the draw-up wrench or tool.

These and other objects and advantages of the present invention will become apparent to those skilled in the art after reading the present specification and the accompanying drawings forming a part thereof, in which.

Figure 1:
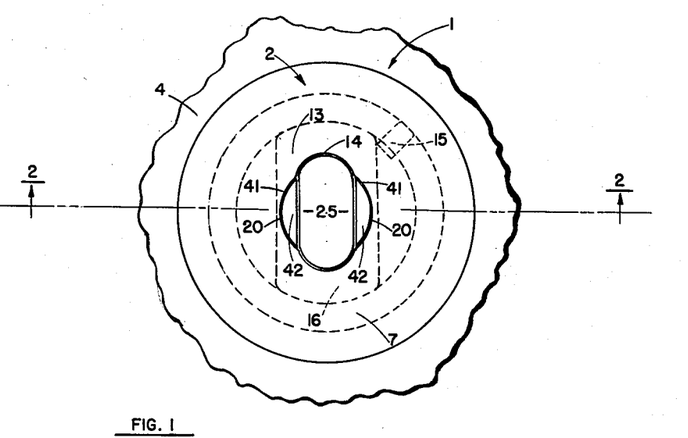
FIG. 1 is a fragmentary top plan view of a structural assembly securely locked together by the quick opening fastener of the present invention.
Figure 2:
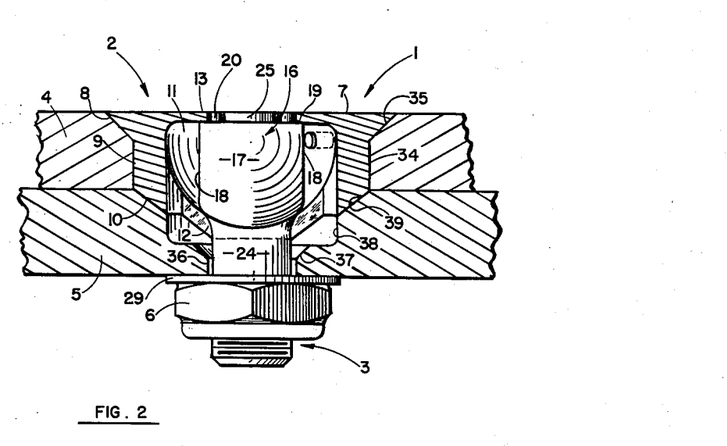
FIG. 2 is a sectional view taken in the plane of line 2—2 in FIG. 1, with the bolt member of the fastener assembly shown in elevation.
Figure 3:
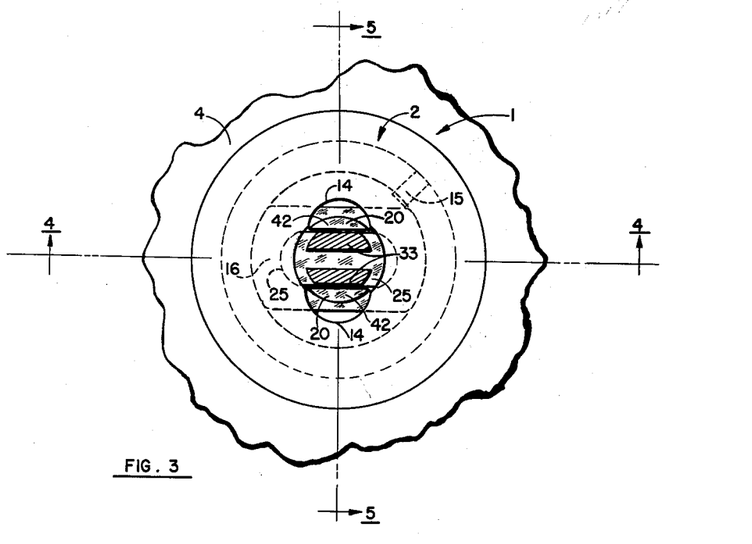
FIG. 3 is a fragmentary top plan view of a panel assembly taken at the exterior surface of the panel assembly in the plane of line 3—3 in FIG. 4, wherein the bolt has been pulled up but not rotated quadrantally to securely clamp the panels in face-to-face engagement and showing the gripping prong elements of the draw-up wrench in cross-section.

Referring specifically to the drawings, wherein like reference characters have been used throughout the several views to designate like parts, and referring at first to FIGS. 1 and 2 which show the fastener assembly 1 in its locked position, in plan and elevational views, respectively, the embodiment illustrated in these figures is a heavy-duty, quick-opening type fastener for use with relatively thick panel members and is designed to carry very large loads in tension and in shear.

As previously mentioned, the terms panel or panel member or plate or plate member as used throughout this specification are to be understood as including not only sheet-like members wherein the transverse dimensions greatly exceed the thickness thereof but also as comprehending any structural or nonstructural member having a planar surface thereon of sufficient area to permit face-to-face engagement of that area with a portion of another sheet-like member or another structural or nonstructural member. For instance, in an aircraft the sheet-like member could be a surface or skin covering member while the structural or nonstructural attachment member could be a rib, spar, longeron, stringer, reinforcing member, doubler or the like. These latter members may form a frame to which a skin member, either with or without reinforcing edge members, may be advantageously fastened to form a structural type access door by means of the fasteners of this invention. The present design lends itself equally well to the joining of a sheet or skin to another sheet or skin even though such skins may be highly stressed and actually deformed by the loads acting thereon. This latter condition will prevail much more in future aircraft design than in the past with the reduction of the number of such separate structural members through the use of integral, highly-stressed load-bearing skins and panels.

The fastener assembly 1 comprises a socket member 2 inserted into an upper plate 4 and a bolt member 3 positioned through an aperture in lower plate 5 and adapted to engage socket member 2 in a manner to transmit loads across the plate while drawing the plates into secure face-to-face clamping engagement. It will, of course, be understood by those skilled in the art that, while socket member 2 is herein described as being a separate insert member, such a socket could be formed integrally with and in the upper plate 4 and that for many purposes such an arrangement would be wholly adequate and would possess a marked economic advantage. However, for a precision fastener assembly, it is preferable to utilize a separate member inserted into accurately drilled and countersunk bores for securing close tolerance mating of the fastener components.

In the heavy duty structure of this embodiment, socket member 2 may be manufactured of any suitable material but preferably it is of a high-strength steel with a cylindrical barrel portion 9 adapted to be inserted into an aperture 34 in upper plate 4 by means of a press or drive fit. Both the socket and bolt members may be formed by any standard shop technique including forging as well as machining. If desired, the socket member insert may have a toothed or splined surface on portion 9 for better gripping the plate aperture wall, and it can also be a screw-in type insert. The lower end of the cylindrical portion 9 terminates substantially at the lower surface of panel 4 and has a further depending tapered surface 10 for seating on a countersink 39 formed around a counterbore 38 in the upper portion of lower panel member 5. Tapered seating surface 10, acting in conjunction with countersunk surface 39, is operative to carry the shear load of one of the panel members into the other panel member. The upper end of socket member 2 has a countersink head portion 8 for seating in a countersink 35 formed at the upper end of aperture 34. In this manner the upper surface 7 of the socket member is made to present a flush continuous surface with the upper or exterior surface of panel member 4.

Interiorly of insert member 2, a hollow hemispherical socket chamber 11 is formed with a closure or cover member 13 extending over the upper end of the socket cavity substantially at its point of largest diameter and forming a flush continuation of socket member upper surface 7. Closure 13 is apertured at 14 to allow entrance of the tool to be utilized in drawing up and locking the fastener. Aperture 14 also forms an integral portion of the fastener locking device, as will be explained in detail hereinbelow. The lower surface of the insert socket member is apertured by a diametrically extending slot 12 providing ingress and egress for the head portion of bolt 3. Apertures 12 and 14, located in the lower and upper surfaces, respectively, of the socket member and angularly disposed relative to each other need not necessarily be of a simple elongated configuration but any one or both of such apertures may take any suitable configuration. These openings may assume a star-shaped, splined or other such configuration if the opening allows entry of a complementarily shaped member followed by mating interference or locking of the parts upon relative rotation therebetween. Such configurations would require only a very small relative angular rotation for locking or unlocking which may be advantageous in some installations. The insert member 12 may also include a stop pin 15 positioned in the wall of the member and projecting a slight amount into the socket cavity to prevent rotation of the bolt head beyond a predetermined location.

Bolt member 3 comprises a head portion 16 and a shank 24. Head portion 16 is of a spherical configuration that has been truncated in three planes to form flat surfaces 18 on oppositely disposed sides and a planar upper surface 19 having boss-like projections 20 extending slightly above surface 19.

The bolt head portion 16 is apertured at its upper surface to form a chamber or cavity 21. This chamber is of a generally elongated configuration, with the principal axis thereof extending diametrically across the bolt head. Undercut portions or cavities 22 are formed in the sides of opposite walls of the cavity 21 and terminating at their upper ends at internal shoulders 23. Bosses 20, projecting above the flat upper surface 19 of the bolt head, are formed, in plan view, as segments of a circle and are adapted to complementarily engage and be rotatable within corresponding arcuate indentations 41 formed in the sides of oblong slot 14 of socket closure 13. By this arrangement, the flat upper surface 19 of the bolt head portion is adapted to contact and be retained by the undersurface of socket closure 13 when the bolt head is inserted within the hemispherical socket cavity. When thus positioned, boss-like projections 20 extend through the opening formed by slot 14 and indentations 41 so that their upper surfaces 42 are flush with the outer surface of closure 13 and form a flush continuation thereof. However, due to the configuration of bosses 20 and the opening formed in closure 13, stud member 3 is freely rotatable relative to socket member 2 when stud head portion 16 is inserted into the socket 11.

Truncation of the bolt head portion forms the latter into an elongated configuration that will readily enter a complementarily configured slot 12, formed in the lower surface of socket member 2, when the axes of the slot 12 and bolt head portion 16 are in alignment. After insertion of the bolt head and rotation of the bolt relative to the socket member insert, spherical segmental portions 17 of the bolt head then come into bearing engagement with the spherically formed surfaces of the hemispherical socket 11, whereby relative axial movement between the bolt member and the socket member is prevented when the socket member and the bolt shank are secured to their respective panels. With the principal axis of the elongated bolt head rotated 90° from the principal axis of slot 12, portions 17 of the bolt head provide the maximum bearing area in engagement with the walls of socket 11. This is the normal engaged position to which the bolt head of the embodiment of FIGS. 1 and 2 is turned after insertion through socket member lower slot 12.

Initial adjustment and tensioning of bolt 3 may be effected by means of nut 6 and washer 29 threaded onto shank 24 of the bolt so as to contact the undersurface of panel 5. If desired, a spacer collar member may be interposed between the nut and the bottom of the plate. It will be noted that aperture 36 provides sufficient clearance around the bolt shank to allow the bolt to shift laterally a slight amount to insure perfect seating of the spherical segmental portions 17 of the bolt head in socket 11. Nut 6 may be of any standard commercially available type but preferably is of a positive locking type. While a nut is illustrated as the bolt retention and tensioning means, the fastening assembly of the present invention is not to be construed as being limited in application to any particular bolt retention means. Any such means may be utilized if it allows the bolt of this embodiment to be freely rotated a quarter turn without axial movement. If a tight face-to-face joint is not required, axial movement to the extent of one quarter of the shank thread pitch may be tolerated and such holding devices as nutplates and the like may also be used therewith.

Figure 4:
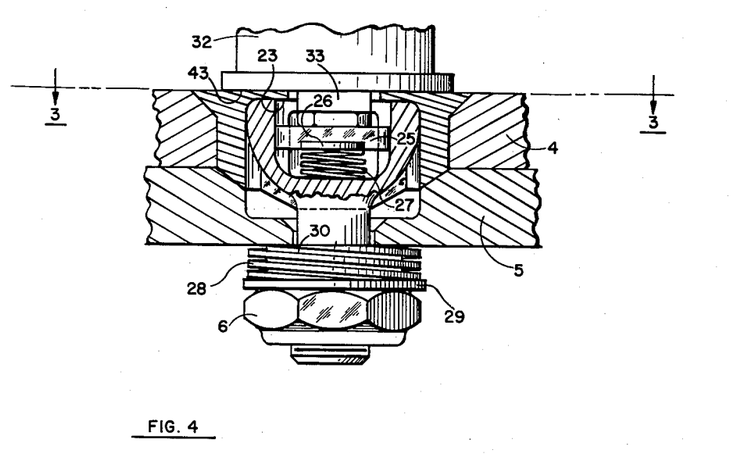
FIG. 4 is a sectional view taken in the plane of line 4—4 in FIG. 3, with the bolt member pulled up but not turned into locking engagement with the socket member of the fastener assembly.
Figures 5, 6, 10, 11:
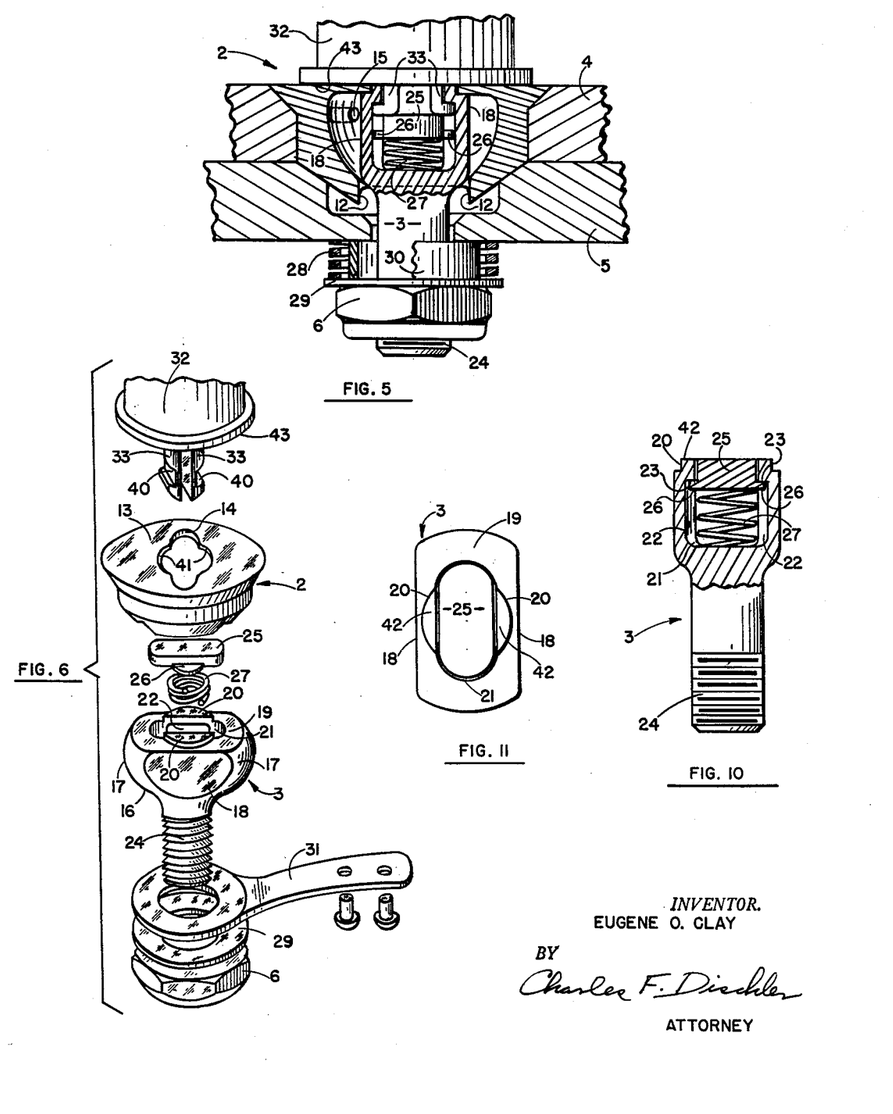
FIG. 5 is a sectional view taken in the plane of line 5—5 in FIG. 3, with the bolt member pulled up and the panel members in face-to-face engagement but with the bolt not turned into locking engagement with the socket member.
FIG. 6 is an exploded view of the fastener of this invention for use with panels or structural members of large thickness and showing one embodiment of a drawback spring that can optionally be utilized with this fastener, if warranted by the installation. In this view the various elements are illustrated in the unlocked or disengaged position.
FIG. 10 is a view, partly in section and partly in elevation, of the bolt member portion of the fastener assembly of the present invention.
FIG. 11 is a top plan view of the head of the bolt member.
Figure 7:
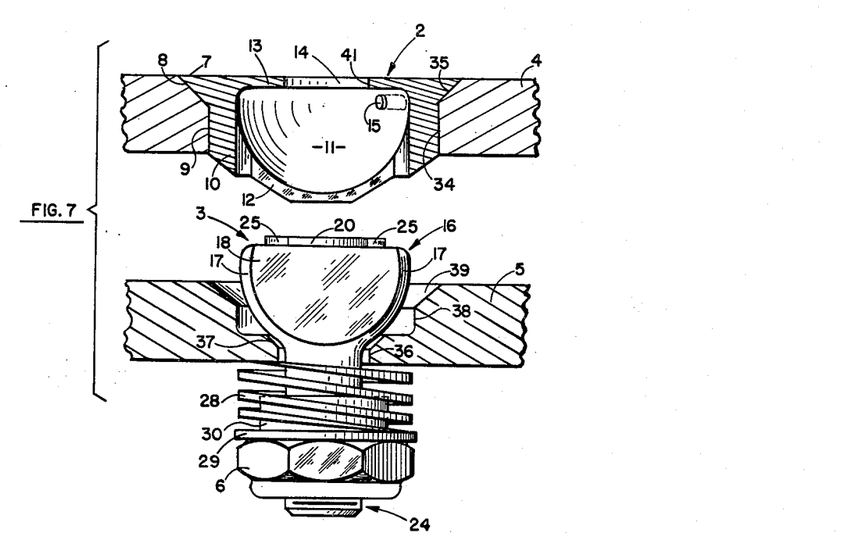
FIG. 7 is a cross-sectional view of heavy duty panel or structural members showing the installation of the socket portion of the fastener assembly in one such member and the bolt portion of the assembly in the other such member. This figure further illustrates a modified method of mounting the bolt member by means of a helical spring to bias the bolt downwardly and the bolt head portion into a recess within the lower panel or structural member.
Figure 8:
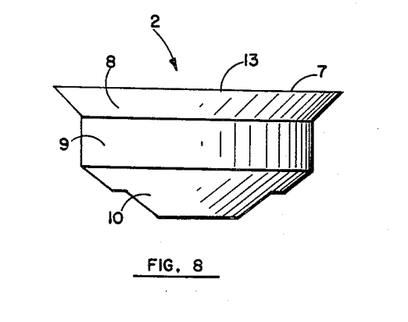
FIG. 8 is a side elevational view of the socket portion of the heavy-duty type fastener assembly wherein the socket member is flush mounted in the outer member to be joined.
Figure 9:
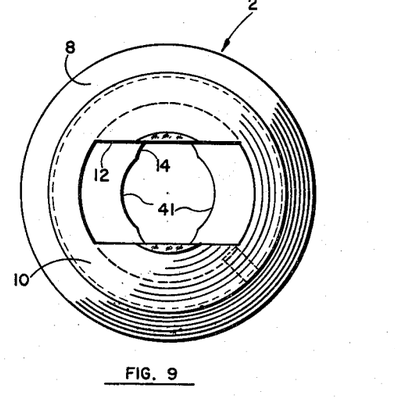
FIG. 9 is a bottom plan view of the socket member of FIG. 8.

It should be clear, therefore, that initial installation of the present fastener is made by inserting the socket member into the upper panel, positioning the bolt head therein in load bearing relation and then simply drawing up the assembly by means of a suitable bolt fastening device, such as nut 6. As in any bolt installation, the holding force and tension in the assembly can be varied as desired and is a function of the torquing force exerted. After such initial adjustment, the quick disengagement and engagement features of the present invention allow the members secured by this fastener to be released and displaced and then returned to their original close proximal relationship without the necessity of any further take up or adjustment of nut 6.

Where the positioning of the members to be joined requires that one of the members, such as an engine cowling, fillet skin or other curved panel, approach the other member angularly instead of normal to the surface thereof, it is desirable that the bolt head be drawn down within counterbore 38 and countersink 37 to allow the angularly approaching upper member 4 to come into face-to-face engagement with the lower member without interference from the bolt head. This may be accomplished by means of a suitable biasing means such as coil spring 28, such as is shown in FIGS. 4, 5 and 7, or by means of a flat leaf spring 31, as shown in FIG. 6, which may be riveted or otherwise suitably attached to the underside of member 5. In the event a helical coil spring is utilized for biasing the bolt outwardly away from the undersurface of member 5, collar 30 must be interposed between the washer 29 and the lower surface of plate 5 to transmit the bearing compression forces therebetween. This collar may either enclose spring 28 or may be located interiorly thereof around the bolt shank, as shown in FIGS. 4 and 5.

In the flush-type embodiment now under consideration, a unique feature of this fastener resides in the use of a combination key or locking device and a flush close-out member for achieving aerodynamic smoothness of the fastener surface. As best seen in FIGS. 5, 6 and 10, a generally oblong or elliptical key member 25 has a pair of ears or lugs 26 extending laterally therefrom, one on each side of the key, at a distance below the upper surface of the key equal to the thickness of the socket closure 13. This key is adapted for reciprocation in chamber 21 and is normally biased upwardly to a position wherein the upper surface of the key is flush with the upper surfaces of the boss projections 20 on the bolt head, as shown in FIG. 11, and with lugs 26 contacting internal shoulder stops 23 within the cavity 21 under the biasing influence of a spring 27 which is positioned in the cavity beneath key member 25. Thus, the upper surface of bolt head 16 normally includes a flush-surfaced, two-piece, closely-fitting raised portion that projects above bolt head surface 19, a distance equivalent to the thickness of the socket member closure 13. This two-piece raised surface is complementary in configuration to the opening made by the combined closure slot 14 and the laterally extending arcuate indentations 41 in the sides of slot 14. Thus, with the bolt head inserted into the socket 11 and with bolt head spherical segmental surfaces 17 in contact with or bearing upon the lower surface of internal socket and bolt upper surface substantially contacting the lower surface of upper socket closure 13, the raised flush surface formed on the bolt head by key 25 and the upper surfaces 42 of bosses 20 forms a closed, smooth, flush surface with the flush upper surface 7 of the socket member and the surface of panel 4, as shown in FIGS 1 and 2. The dimensions of the various mating parts of the locking arrangement may be proportioned so that only a fine hairline crack will exist along the matching boundaries of the opposed surfaces and the flush surface will present a truly smooth aerodynamic surface. By holding proper machining tolerances, this crack may be held to .0015 of an inch in width.

It should be noted that while the fit between the ends of key 25 and the adjacent end walls of chamber 21 is such as to allow ready up and down movement of the key without interference, it is sufficiently close so that the key remains normal to the axis of reciprocation without any appreciable angular displacement that might otherwise tend to cause cocking and jamming of the key. If further stabilization of the key is desired, a pin may be extended centrally downwardly below the key to engage a center hole in the bolt.

A further modification, not shown on the drawings, may be made to simplify the construction of key member 25. By forming biasing spring 27 with a diameter greater than the transverse width of the key and securely attaching it to the undersurface of the key, the topmost spring coil may be utilized to contact the inner shoulder stops 23 and the lugs 26 may thereupon be eliminated.

The tool or wrench for performing the sequence of operations whereby the members or panels are drawn into firm engagement and the bolt head is then turned into engagement with the socket, followed by locking of the keying device, may assume a number of configurations. The same tool is utilized for performing the reverse sequence of operations to disengage the members. Such a tool has two general requirements. These include the use of a prong-like gripping device of a type that may be moved axially inwardly or outwardly from the end of a tool bearing against the upper surface of the socket insert member and one in which, when it is drawn inwardly, the gripping prongs are caused to spread outwardly into gripping engagement by means of a central wedge-like mandrel or camming surface. This type of a device is well known in the art and is, in general, somewhat similar to the commonly used Cleco fastener or grip. Prongs 33 of the illustrated tool 32 have slots 40 formed on the exterior surfaces thereof for gripping as the prongs are spread outwardly. This particular gripping configuration may be suitably changed as required or desired to a serrated configuration or any other suitable form providing positive gripping surfaces between the tool and bolt head interior. The other requirement of the draw-up tool consists of a means for applying sufficient draw-up force to bring the stressed, and oftentimes bowed or deformed members, into close face-to-face engagement. This may be accomplished either by a straight tension pull device or it may be a tool having lever actuation to supply force multiplication as where heavy members, such as are illustrated in the embodiment described above, are concerned. Another such type of tool may utilize a cam actuation, such as an eccentric roll-over or the like, for draw-up of the workpieces. Once the members or panels have been drawn into engagement, the tool and the bolt gripped thereby are rotated substantially 90° relative to the draw-up position of the bolt, for the embodiments of FIGS. 1–6, to place the spherical segments of the bolt head in bearing engagement with the socket. At the same time this places key 25 in position beneath slot 14 in the socket closure, whereby, upon withdrawal of the tool, spring 27 biases the key upwardly into flush locking engagement with the key slot. It should be noted that the bosses 20 projecting above the flush surface 19 of the bolt head form portions of a cylinder having the same radius as the circle of which arcuate indentations 41 form a part. Thus, these projections may fit into the opening formed by the combination of slot 14 and indentations 41 and be rotated therein without interference. It should also be noted that all of the pull-up force necessary to draw the plates into close engagement is supplied by means of the pull-up tool. Consequently, with the plates held in close juxtaposition, the only force opposing rotation of the fastener components to a locked or unlocked position is that due to the frictional force resulting from the relative rotational movement between the socket and the contacting bolt head surfaces.

Engagement or fastening of the device of this invention consists in first positioning plate 4 in juxtaposition to plate 5 with the apertures therein in alignment and socket insert member 2 seated within counterbore 38. The gripping prongs of the draw-up wrench, in their most forwardly extended and closest proximal position, are then inserted within the bolt head cavity by depressing key member 25 and the bolt is then drawn securely up into the hemispherical socket by operating the lever handle of a suitable tool to expand the prongs outwardly to grip the edges of slot 14 and to draw up the gripping prongs upwardly into the tool body while the tool face 43 abuts upper surface 7 of the socket member. This action draws bolt head 16 up into socket 2 through slot 12. With the bolt thus raised, the tool is then rotated 90° to a locking position, wherein the spherical segmental portions 17 of the bolt head operatively contact the lower bearing surfaces of the hemispherical socket 11 and whereby locking key 25 is in alignment with the upper closure slot 14. Withdrawal of the tool then allows key 25 to be biased outwardly into slot 14 by spring 27 to form the flush continuation of the socket member upper surface 7 and closure 13.

With the fastener in its closed, drawn-up, secured position, as shown in FIGS. 1 and 2, the sequence of operations for disengaging the assembly is as follows: With the prongs of the pull-up tool extended to their outermost position and in their closest proximal position relative to each other, the prongs 33 are placed on top of key 25 and pushed in to depress the latter against spring 27. By suitable manipulation of the tool lever handle, the prongs may be expanded outwardly to grip the upper end of the bolt head at each of the internal shoulders 23 and projecting bosses 20. Simultaneously with the gripping operation, which effectively locks the tool to the bolt head, tool face 43 is drawn forcibly down onto the outer surface of socket closure 13. Continued operation of the tool lever in effect causes the tool and gripping prongs to become an extension of the bolt whereby the tension force on the bolt is transmitted to the outer surface of the socket closure. This relieves the bearing load that normally exists between the spherical bolt head segments and the socket and allows the bolt to be easily rotated. The tool is then turned 90° to rotate the bolt head to a position parallel to the lower socket slot 12. In this position the tool handle lever may be released to allow the gripping prongs to come together, whence it may be withdrawn and the plate members 4 and 5 then may be separated since the fastener is no longer in a gripping position and the socket member may be lifted or removed from the bolt portion by movement of plate 4 away from plate 5. Since the bolt has, secured to its shank portion, a fastening device that is of greater diameter than aperture 36, and since the bolt head is similarly of a greater diameter than this aperture, the bolt will remain positioned within plate 5, while the socket member remains in plate 4. The present fastener assembly thus incorporates a unique fool-proof feature in that after initial installation all portions of the assembly remain with one or another of the panel or plate members and there are no loose parts to become lost.

This fool-proof feature is of great importance in aircraft engine intake duct installations. With present and advanced designs, such ducts have large cross sectional areas and often the duct walls must include access panels or doors to allow servicing of adjacent equipment. It has been a common hazard in the past that loose screws and similar fasteners have been ingested into turbojet engines after such panels have been replaced after servicing. My device totally eliminates this hazard since there are no loose parts that can be thus ingested.

While the fastener device of the above described embodiment is suitable for securing workpieces wherein the upper panel member has a local thickness of at least ¼" and the lower panel or supporting structure has a local thickness of at least ⅜" around the attachment, somewhat different configurations of fasteners are found to be more suitable for installations wherein the members to be fastened are of a lesser thickness. For securing workpieces having local thicknesses of the order of approximately ¹⁄₁₆" to ³⁄₃₂", the embodiments illustrated in FIGS. 12-17 and FIGS. 23-25 present unique fasteners which are ideally suited for the joining of the thinner skin or panel members to other substructure members which may be either relatively thin or thick. Installation of one such embodiment is shown in a perspective view, partly in section, in FIG. 12. Herein, socket member 51 is formed to be insertable into overlapping countersunk apertures formed in the upper panel 53 and lower panel or frame 54. Countersink 56, formed in the lower panel, is of a smaller diameter than countersink 55 formed in the overlying upper panel 53, and the lower tapered end of countersink 55 projects over the upper portion of the aperture of countersink 56 and in conjunction therewith forms a reentrant lip or shoulder 71. Typically, this annular shoulder may have a width of approximately .010 inch.

Figure 12:
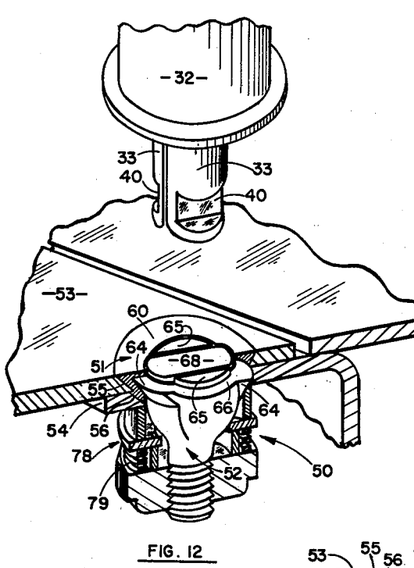
FIG. 12 illustrates, in a cutaway perspective view, a modification of the fastener of the present invention that is particularly advantageous for joining thin-gauge members wherein the thickness of the members is insufficient to allow insertion of the standard socket member or bolt head of the heavy duty embodiment.
Figure 13:
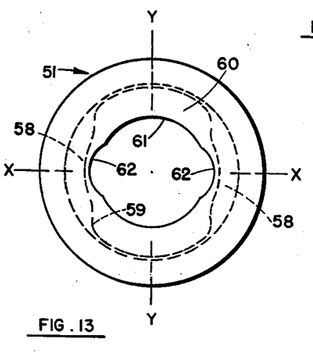
FIG. 13 is a top plan view of the modified socket insert member for use with stressed thin-gauge members.
Figure 14:
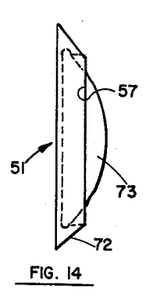
FIG. 14 is a side elevational view of the modified socket insert member taken looking along the y—y axis of FIG. 13.
Figure 15:
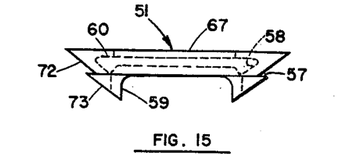
FIG. 15 is a side elevational view of the modified socket insert member taken looking along the x—x axis of FIG. 13.

The socket insert member 51 is formed with separate tapered sections 72 and 73 complementary to the taper of the countersinks and with a matching narrow annular shoulder 57 separating the tapered sections for abutment against lip 71 whereby the socket member 51 may be locked into the countersink aperture formed in upper panel 53. Typically, this annular shoulder may have a width of 0.010 inch and provides the means for locking the insert to the upper panel member 53. The insert member may be positioned within the countersink apertures by depressing opposite edges of the insert member to allow shoulder 57 to enter and grip the lower surface of panel 53 around the edge of aperture 55, upon release and return of the insert member to its normal at-rest configuration. In a manner similar to the earlier described embodiment, the insert contains an internal socket 58 of somewhat lesser depth than that of the previous embodiment. The lower end of the socket is slotted at 59 for the entrance of the bolt head, while the upper portion or closure 60 of the socket member has a circular aperture 61 formed therein with oppositely disposed arcuate indentations 62 in the sides of aperture 61. This circular aperture and the associated indentations formed in closure 60 serve the same purpose as the similar structure did in the first described embodiment, i.e., a means for reception of the projecting bolt head bosses and the bolt anti-rotation key.

Unlike the bolt previously described, bolt member 52 has a substantially hemispherical head portion 63 which fairs into an upper cylindrical portion 69 having oppositely disposed lugs 64 extending outwardly therefrom flush with the edges of the bolt upper surface 66 along opposite sides of the bolt head. These lugs have sloping lower surfaces that are complementary to the relatively flat socket cavity 58 within insert member 51. As before, oppositely disposed arcuate bosses 65 project above the flat upper surface 66 of the bolt head and are dimensioned so that their upper surfaces form a flush continuation of the outer surface 67 of the socket insert member closure 60 and of the upper panel 53 when the bolt is drawn up and locked in place. A spring biased locking key 68 is positioned within a cavity formed in the upper portion of the bolt head for projection into the opening formed by aperture 61 and indentations 62 to act in conjunction with the arcuate indentations 62 to key or lock the bolt against rotation when it has been drawn up and turned into its engaged position, all in the same manner as described for the previous embodiment. It will be appreciated that this embodiment can be utilized with members or panels much thinner than those possessing a thickness sufficient to accommodate substantially the full depth of the bolt head and socket member as was described in the previous embodiment. In the present installation, only the upper portion of the bolt head is seated within the socket member and the projecting lugs or lips 64 formed thereon contact and bear on the lower surfaces of the socket member to transmit the axial tensile load of the bolt. The shear load is, of course, transmitted from one plate to the other by means of the socket member.

Figure 16:
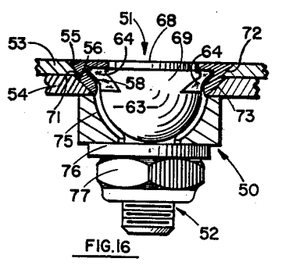
FIG. 16 is a sectional view of an installation utilizing the modified fastener with a further modification in the method of tensioning the bolt against the lower panel or structural member.
Figure 17:
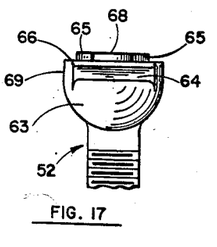
FIG. 17 is a partial side elevational view of the modified bolt head portion looking at the attaching lugs or projections on the bolt head.

As shown in FIG. 16, a spacer member 75 may be positioned to encompass the hemispherical portion of the bolt head and, in conjunction with a washer 76, to transmit the tensioning force of nut 77, as the bolt head is drawn downwardly into forcible contact with the socket member surfaces, to the lower panel 54. A somewhat different arrangement of a bolt tensioning substructure installation is shown in FIG. 12. Herein, an assembly 78 consisting of collars, spacers and a washer, which can be either a separate or an integral subassembly, is positioned between lower panel 54 and the nut. A spring 79 is interposed between the washer and nut to insure that the bolt will automatically draw back upon its release to facilitate removal of an upper panel that is so configured or hinged that it must necessarily move outwardly along a path other than normal to the surface of the lower panel. Other than the changes in configuration of the socket member and bolt head, which have been occasioned by the thinness of the members being joined, this modification functions in exactly the same manner as the heavy duty embodiment. Release and engagement are accomplished in exactly the same manner by the same or a similar type of tool. Since this particular modification is generally for use with less heavily loaded structures, a direct spring loaded draw-up tool of a T-handle configuration may be used without requiring any force multiplying lever system.

Figure 23:
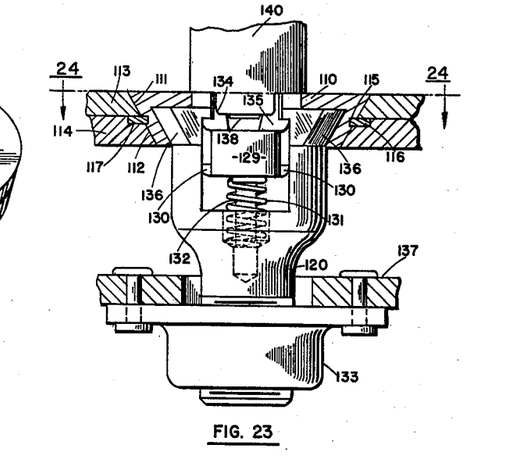
FIG. 23 is a cross-sectional view of a panel assembly utilizing a preferred embodiment of a lightweight fastener in accordance with the present invention for joining thin-gauge members.
Figure 24:
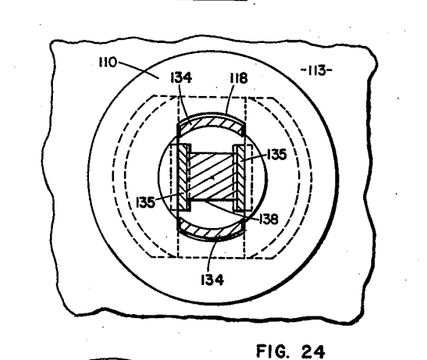
FIG. 24 is a view taken in the plane of lines 24—24 in FIG. 23 showing, partially in section and partially in plan view, the relationship of the draw-up wrench operating elements to the slotted stud head and socket member.
Figure 25:
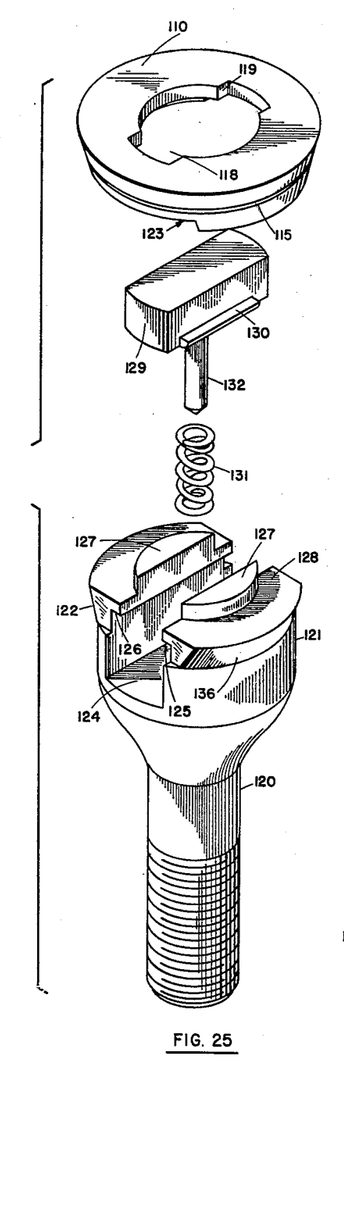
FIG. 25 is an exploded view of the preferred lightweight fastener assembly.
Figure 26:
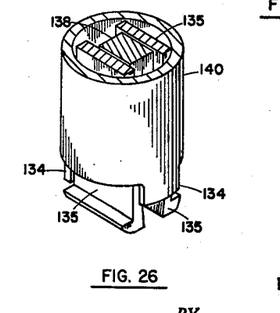
FIG. 26 is a fragmentary view of the lower end of a type of draw-up wrench for use with the fastener assembly shown in FIGS. 23–25.

The embodiment of FIGS. 23–25 illustrates another configuration which probably most nearly represents the optimum design of a lightweight fastener for thin gauge materials both from the standpoint of ease of fabrication as well as operability and the maintenance of pre-set stud tension and dimensional adjustments.

Unlike all of the previous embodiments, in this arrangement the socket member is designed to rotate within the upper panel for locking and releasing the stud which is secured to any suitable adjacent structure, as by a nutplate. In this arrangement, similarly to the previous embodiments, the draw up of the stud into the socket is accomplished by the wrench but herein the stud normally does not rotate. However, the stud may be rotated along with the socket for axial adjustment purposes if desired and if the nutplate or stud securing device does not include a rotational locking feature preventing such rotation. As shown in FIG. 23, socket or collar member 110 is frustoconically shaped to fit the continuous, matching countersink surfaces 111 and 112 formed fully through the upper panel 113 and the lower panel 114, respectively, as if these panels had been a single unitary member. The shear loads are transmitted from one panel to the other by means of the socket member at the contacting surfaces of the panel countersinks and the socket member. An annular groove 115 is formed intermediate the upper and lower surfaces of the socket for reception of a portion of a retainer ring 116. The other portion of ring 116 is positioned in a complementary groove 117 formed in the upper edge surface of the lower panel. By this arrangement the socket member is secured to but freely rotatable within the upper panel 116.

As in each of the other embodiments, the socket member is formed with apertures or slots, angularly disposed relative to each other, in its top and bottom surface. The upper slot 118 is essentially the same as that shown and described for the previous embodiments. However, unlike the cloverleaf design of those embodiments and in order to provide better bearing surfaces for the stud locking key, shoulders 119 are formed intermediate the arcuate portions of the slot boundary.

Stud member 120 has an enlarged head portion 121 including oppositely disposed tapered shoulders 136 extending radially therefrom for contacting and retention by socket member 110. These shoulders are formed by removal of oppositely disposed segments of the upper conically tapered portion 122 of the stud head portion to result in an upper portion of the bolt head having a configuration complementary to that of the socket lower slot 123.

A diametral slot 124 with undercut portions 125 forming internal shoulders 126 is provided in the upper end of the bolt head. Segmental circular bosses 127 project from the nominal bolt end surface 128, one on each side of slot 124. Locking key 129 is axially movably disposed in the slot with lugs 130 formed on each side of the key extending into the slot undercut portions to contact internal shoulders 126 and stop upward movement of the key to form a flush upper surface in conjunction with bosses. Key 129 is biased upwardly, as before, by means of a spring 131. A depending post 132 adapted to fit a socket drilled into the bottom of slot 124 provides a guide and a support for the spring. As before, the upper surfaces of locking key 129, bosses 127, and socket 110 form a smooth flush continuation of the surface of upper panel 113.

As shown in FIG. 23, stud 120 is secured to any suitable adjacent fixed structure 137 by a nutplate 133, while the stud could be tensioned from the lower surface of panel 114 and made rotatable relative thereto, the unique features of this embodiment are best realized by fixedly securing the stud to adjacent structure. With this arrangement, the collar or socket 110 is instead rotated to lock and unlock the stud. Thus, the initial adjustment of the stud need never be disturbed, not even to the extent of a fraction of the thread pitch as occurs in the other embodiments. This embodiment is thus particularly advantageous not only in regard to maintaining pre-set axial dimensional tolerances but also in that it permits normally inaccessible fasteners of the nutplate type to be utilized therewith.

Rotation of the socket or collar member requires a slightly modified tool from that priorly described. Pulling the stud into the socket, as well as turning of the stud, could be accomplished in the previous embodiments solely through the instrumentality of prongs 33 of the previously described draw-up wrench 32. For the present configuration, some additional means is required to rotate the socket for locking or unlocking the bolt thereto. This is accomplished by means of a draw-up wrench 140 of the type previously described which additionally incorporates two oppositely disposed tangs 134 exteriorly of the draw-up prongs 135. Tangs 134 are shown in cross section in the view of FIG. 24 in relation to the socket member. It will be seen that when locking key 129 has been depressed by wrench prongs 135, the tangs will mate with the outer arcuate ends of upper slot 118. Rotational movement of the tangs by a suitable tool mechanism which forms no part of the present invention causes the tangs to bear against shoulders 119 and rotate the socket member. Prongs 135 are moved outwardly into stud gripping engagement by axial movement of inner tapered mandrel 138.

In addition to the above described features and advantages of this particular embodiment, another important advantage resides in the simplification of the requisite manufacturing processes. While the unitary bolt with an enclosed cavity requires either cold forging or welding of the upper surface in order to effect closure, the present design is susceptible of manufacture by simple broaching, milling, drilling and turning operations.

Figure 18:
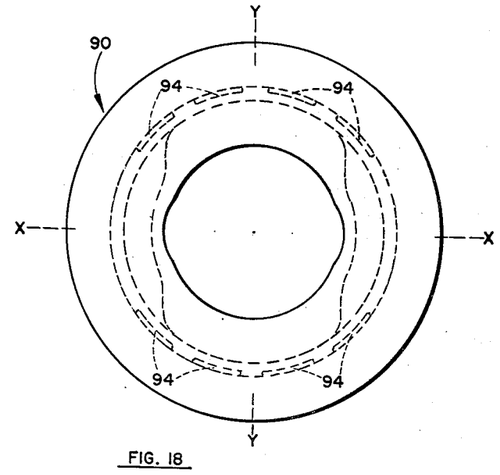
FIG. 18 is a top plan view of another modification of the socket member combining features of both of the prior embodiments of FIGS. 1–11 and FIGS. 12–17 for securing the insert within an upper plate having a thickness range intermediate that for which the prior embodiments are particularly adapted.
Figure 19:
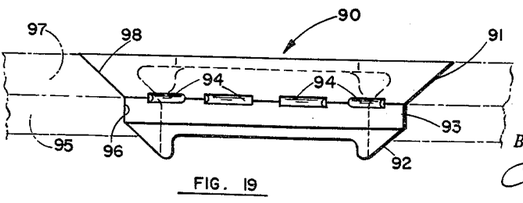
FIG. 19 is a side elevational view of the modified socket member of FIG. 18 taken looking along the x—x axis of FIG. 18.
Figure 20:
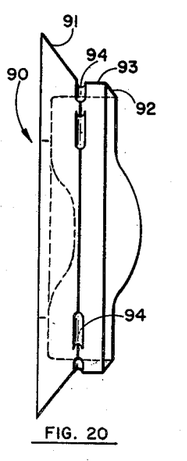
FIG. 20 is a side elevational view of the modified socket member of FIG. 18 taken looking along the y—y axis of FIG. 18.

While the heavy duty embodiment of FIGS. 1–9 is particularly applicable for bolt sizes greater than ¼" and the lightweight embodiments of FIGS. 12–17 and FIGS. 23–25 are most advantageously used for bolt sizes of ¼" and less, a further modification in the configuration of the socket member for ¼" bolt sizes has also been found advantageous. As shown in FIGS. 18, 19 and 20, this socket member 90 partakes of features of both the heavy duty and the first of the lighter duty embodiments described above. Similarly to the first described structure, it includes upper and lower tapered or frustoconical surfaces 91 and 92, respectively, separated by a relatively short cylindrical surface portion 93. A series of grooves or indentations 94 are formed around the periphery of the socket member 90 at the junction of upper tapered surface 91 and cylindrical surface 93. Lower plate 95 has a bore 96 therein for reception of cylindrical portion 93. Dependent on the thickness of plate 95, bore 96 may or may not terminate or bottom into a frustoconical lower portion matching lower tapered surface 92 of the socket member insert. Upper plate 97 has the usual countersink 98 formed therein. As in the first light duty embodiment, the lower end of the countersink has a diameter that is slightly smaller than that of bore 96 in the lower plate to thereby form a narrow annular shoulder or lip at the junction of the plates. In the present modification this lip will be no more than several thousandths of an inch in width. This forms an interference fit with cylindrical surface 93, and, as the socket member is fully pressed into the upper plate, portions of this lip will engage the grooves 94 and provide additional gripping force to secure the socket member in thinner sheets in the same manner as in the lighter duty embodiment. The use of a plurality of intermittent grooves, in this manner, also serves to prevent rotation of the socket member in the upper plate. If found desirable, a single continuous groove may be formed around the periphery of the socket member instead of a plurality of small grooves. Since the socket member is wholly secured to the upper plate, the plates may be separated without interference. In this embodiment the internal socket is preferably formed for coaction with a bolt having oppositely disposed lug portions extending radially therefrom as in the embodiment of FIG. 12.

Figure 21:
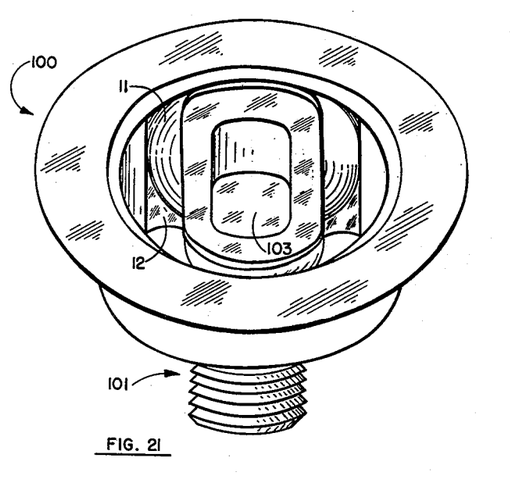
FIG. 21 is a perspective view of a simplified open type fastener assembly made in accordance with the teaching of this invention but lacking in the flush close-out feature.
Figure 22:
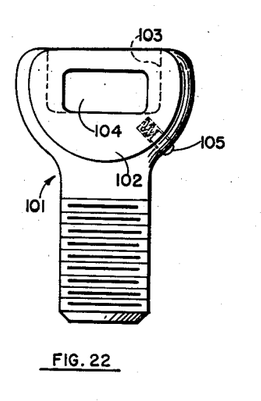
FIG. 22 is a side elevational view of the simplified bolt structure for use with the open type fastener assembly of FIG. 21.

A further but less-sophisticated modification of the present invention is shown in FIGS. 21 and 22. For installations not requiring a flush surface this embodiment presents a more economical fastener having the same features of ready engagement and release as are contained in the previously described embodiments. In this device the socket member 100 is exactly similar to socket member 2. Bolt 101, however, while truncated to form flats 102 on two sides of the bolt head and having a cavity 103 communicating with the upper surface thereon contains no key member therein. Apertures 104 are formed through the flat surfaces 102 into cavity 103. This provides a simple structure which the draw-up tool prongs may readily grip, without requiring undercutting within the cavity to provide shoulder portions for such gripping action. Locking of the bolt to the socket to present rotation may be accomplished by a detent means, such as a spring biased ball detent 105, positioned either in the bolt head or the socket member to engage a suitable groove or depression in the other member. A separate cover plate may also be used with this embodiment if desired and may be used for locking as well.

From the foregoing, therefore, it is clear that I have provided a unique fastener capable of joining together highly stressed members and of transmitting large tensile and shear loads, yet which can be disengaged and reengaged by a rotational movement of less than a full turn of the bolt. In my assembly the shear loads are all transmitted by the socket member and the tensile forces are carried by the bolt, thereby providing ease in the design of a particular fastener for a particular application.

While particular embodiments of this invention have been illustrated and described herein, it will be apparent that various changes and modifications may be made in the construction and arrangement of the various parts without departing from the spirit and scope of this invention in its broader aspects, or as defined in the following claims.

I claim:

1. A fastening device for securing in an overlapping load-carrying relationship first and second stressed panels, each of which has a registering opening therethrough, comprising an enclosed socket member adapted to be positioned in the opening of said first panel and having a slot therethrough in its upper and lower surfaces; said slots having their major axes angularly displaced relative to each other; a bolt member having an enlarged head portion complementary to said socket member and dimensioned to permit entry thereof into said socket member through said lower slot; means operatively contacting said bolt and the outer face of said second panel for tensioning the bolt member, said bolt member passing through said apertured second sheet and being secured thereto while disengaged from said socket member by the tensioning means on the nonadjacent side of the second panel; and a locking means in said bolt head for engaging said socket member upper slot and securing the bolt member to the socket member after the bolt head portion has been passed through the lower slot into said socket member and rotated to place said bolt head complementary portion in engagement with said socket member whereby the stressed panels are securely and fixedly positioned relative to each other.

2. A quickly operable fastener comprising a mating bolt and socket assembly wherein the socket portion of the assembly comprises a unitary socket member having slotted upper and lower surfaces with said slots having their major axes nomally displaced relative to each other, wherein the socket member is adapted for insertion into an apertured member; and wherein the bolt portion of the assembly includes a bolt member with means on the shank end of the bolt adapted to operatively contact a second apertured member for tensioning said bolt member and a head portion complementary to and insertable through the slot in the socket lower surface and rotatable substantially ninety degrees into bearing engagement with the socket member; said bolt member head portion including a means complementary to and projectible into the upper surface slot for locking the bolt member to the socket member upon rotation of said bolt member head portion into bearing engagement with the socket member and preventing relative rotation between the bolt and socket member of the assembly after insertion of the bolt member head portion into the socket portion.

3. A flush-surfaced fastening device for securing together overlapping members having registering openings therethrough comprising a socket member having a slotted upper and lower surface and adapted to be rotatably carried by one of such overlapping members, said upper and lower surface slots having their major axes angularly displaced relative to each other; a bolt member having an enlarged head portion complementary to and adapted to pass through said lower surface slot, said head portion having a diametral slot extending therethrough and axially therein and further having shoulder portions complementary to said socket member and adapted to seat in said socket member upon insertion through said lower surface slot and rotation in said socket member; means for tensioning said bolt member; and an outwardly biased keying means axially movable within said bolt complementary to and engageable with the socket member upper surface slot for locking said bolt member to said socket member upon seating of said head portion within said socket member, the upper surfaces of said socket member, said bolt member and said keying means forming a flush continuous surface with the outer surface of said one member.

4. A fastening device for securing faying, overlapping members together, comprising a socket means adapted to be carried by one of said members and having upper and lower wall portions with oppositely-disposed non-circular apertures therein, said apertures being non-coincident in planform; said socket means having a smooth-walled chamber therein with converging lower wall portions; a bolt member including a non-circular head portion complementarily configured relative to and adapted to pass through the non-circular aperture of said lower wall portion into said socket means when properly aligned relative thereto in a first predetermined position, said bolt member head portion including portions complementary to and adapted to bearingly engage said socket means converging lower wall portions upon insertion of said head portion into said socket means and relative rotation of said bolt and socket means to a second predetermined position whereby the socket non-circular lower aperture and said non-circular bolt member head portion are placed out of matching alignment; and releasable locking means within said bolt head portion of a non-circular configuration complementary to the non-circular aperture in the upper surface of said socket member, said releasable locking means being biased to project from said bolt head portion into said socket member upper surface non-circular aperture upon insertion of said bolt head portion into said socket member and relative rotation therebetween to said second predetermined position wherein said upper surface non-circular aperture is placed in alignment with said non-circular releasable locking means and said bolt member is anti-rotationally locked to said socket means.

5. A fastening device for securing together overlapping members, each of which has a registering opening therethrough, comprising a socket member adapted to be carried in the opening of one of said overlapping members and extending into the registering opening in another of said overlapping members, said socket member having an enclosed socket chamber and upper and lower surfaces with elongate non-aligned apertures therein; a bolt member having a head end complementarily configured to said lower surface aperture and adapted to pass therethrough and having shoulder portions complementary to portions of said socket chamber and adapted to be rotated into seating engagement in said socket chamber after insertion through said lower surface aperture; means securing said bolt member to another of said overlapping members; and resiliently biased axially movable releasable locking means within said bolt head portion complementarily configured to and engageable with said socket member upper surface aperture upon rotation of said bolt member head portion into seating engagement within said socket chamber whereby said bolt member is releasably locked to said socket member.

6. A fastening device as set forth in claim 5, wherein said axially movable releasable locking means includes an axially movable key member and a biasing means urging said key member outwardly to a position flush with the socket member upper surface and into locking engagement with the socket member upper surface aperture.

7. A non-threadably interconnected interference type fastening device for securing in a faying over-lapping load-carrying relationship first and second stressed members, each of which has a registering opening therein comprising a socket member having a socket chamber therein and upper and lower surfaces having slots therein and adapted to be positioned within said first stressed member, said slots being non-coincident in planform; a bolt member having a shank end and an enlarged head end having portions complementary to said socket chamber and adapted for seating therein and configured to permit entry of the bolt head end into said socket member through the slot in its lower surface; means operatively contacting the shank end of said bolt member and the outer non-faying side of said second stressed member for tensioning the bolt member when seated in said socket chamber, said bolt member passing through said apertured second stressed member and being retained while disengaged from said socket member by the tensioning means on the non-faying side of the second stressed member, said bolt head end including spring biased axially movable locking means therein complementary to and engageable with said socket member upper surface slot upon seating of the bolt member head end portions in said socket chamber to thereby anti-rotationally lock the bolt head in said socket chamber, said locking means being movable axially inwardly within the bolt head portion to unlock said bolt member from said socket member to thereby permit rotation of the bolt member and separation of the first and second stressed members.

8. An aerodynamically flush quick-opening fastener for securing in an overlapping relationship first and second stressed members, each of which has a registering opening therethrough, comprising an enclosed socket member adapted to be carried in the opening of said first stressed member and having upper and lower surfaces each with a slot therethrough, said slots having their major axes angularly displaced relative to each other; a bolt member having an enlarged head portion with segmental portions complementary to and engageable with said socket member, said enlarged head portion being configured to permit entry of the head portion into said socket member through the lower surface slot therein; means operatively contacting said bolt member and the non-faying side of said second stressed member for tensioning the bolt member, said bolt member being secured to said second stressed member while disengaged from said socket member by the tensioning means on the non-faying side of the second member; said bolt member head portion having a planar upper face and a chamber therein opening at said upper face with said chamber including undercut portions forming internal shoulders therein; and a locking means in said head portion complementary to said socket member upper surface slot and adapted to engage said upper surface slot and secure said bolt member against rotation relative to the socket member after insertion of the bolt head portion through the lower surface slot into the socket member and rotation of the bolt member to place said bolt member segmental portions in bearing engagement with the socket member, said locking means including lug means for engagement with said internal shoulders for retaining said locking means in said bolt member head portion chamber.

9. A fastening device as set forth in claim 8 wherein said enclosed socket member comprises a ball socket member and the major axes of said slots in the upper and lower surfaces of said socket member are normal to each other.

10. A quickly operable fastener as set forth in claim 2 wherein said locking means forms, in conjunction with the socket upper surface and bolt head portion exposed surfaces, a smooth flush exposed fastener surface.

References Cited in the file of this patent

UNITED STATES PATENTS

| | | |
|---|---|---|
| 481,566 | Hunter | Aug. 30, 1892 |
| 2,177,215 | Hodgkinson | Oct. 24, 1939 |
| 2,335,828 | Herget | Nov. 30, 1943 |
| 2,338,333 | Jenkins | Jan. 4, 1944 |
| 2,390,173 | Richey | Dec. 4, 1945 |
| 2,485,010 | Nocolet | Oct. 18, 1949 |
| 2,631,348 | Bailey | Mar. 17, 1953 |
| 2,900,697 | Cuss | Aug. 25, 1959 |

FOREIGN PATENTS

| | | |
|---|---|---|
| 298,044 | Great Britain | Oct. 4, 1928 |
| 870,757 | France | Dec. 22, 1941 |